United States Patent Office 3,240,284
Patented Mar. 15, 1966

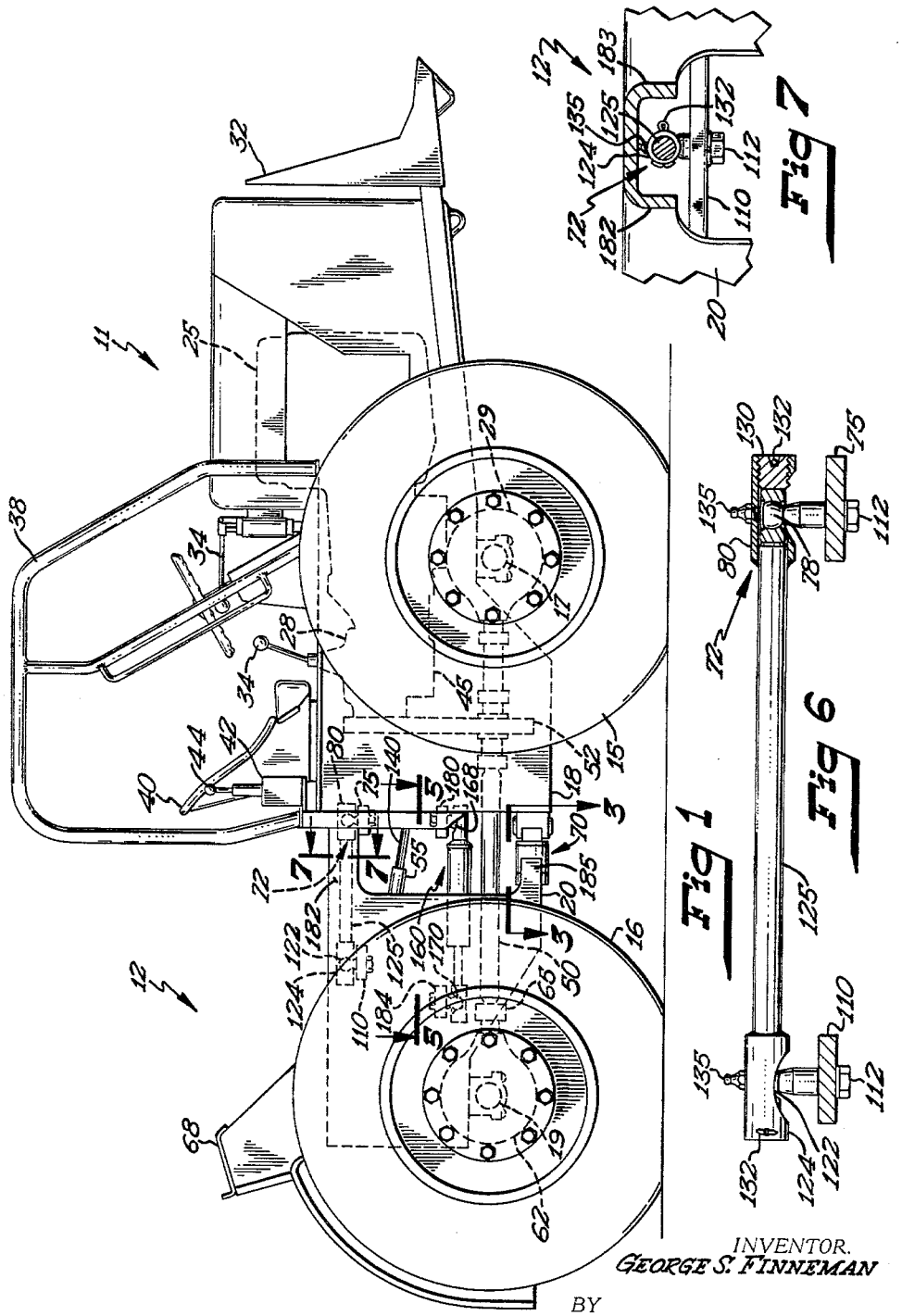

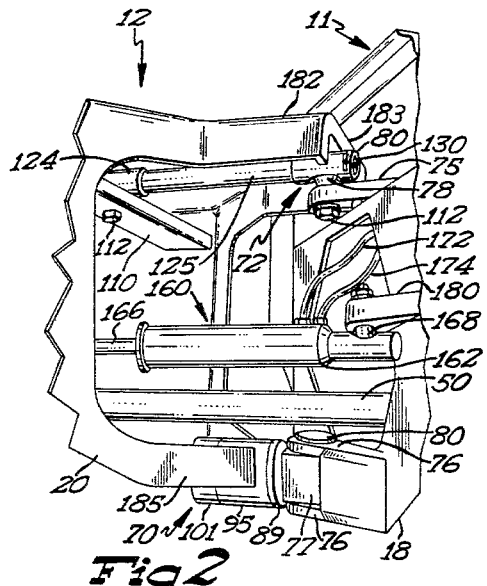
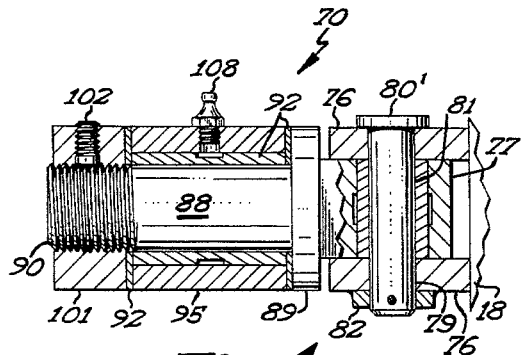
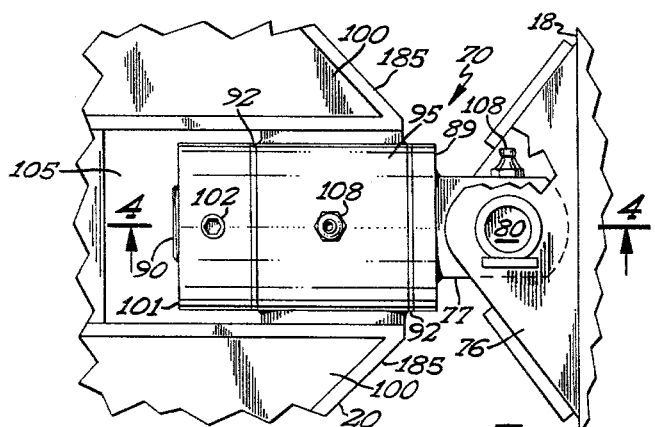
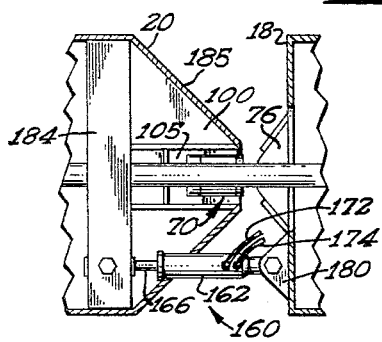

3,240,284
STEERABLE ARRANGEMENT FOR A VEHICLE HAVING FOUR DRIVEN WHEELS
George S. Finneman, Duluth, Minn., assignor to National Iron Company, Duluth, Minn., a corporation of Delaware
Filed May 27, 1964, Ser. No. 370,616
10 Claims. (Cl. 180—51)

The present invention relates to steerable vehicles and more particularly to an improved vehicle of this type having pivotal interconnecting forward and rear frame sections. This improved steerable vehicle of the articulable type is power driven at both frames and steerable through relative positioning of the frames about a steering axis, with the improvement herein relating to the suspension and operative connection of the articulable frames.

While devices of this general type are recognized and in use, various types of operative connections are utilized which permit steering and relative movement between parts. In the past, ball type suspensions or universal joints have been utilized for this purpose. These connections may either limit movement of the frames or provide such extremes in movement as to be subject to extreme wear and load limitations, produce instability in the vehicle, and require excessive maintenance. In apparatus of this type, relatively fixed drive wheels on each frame are operatively connected to a driving motor and this operative connection between the frames and the connection of the steering means therebetween must be capable of permitting relative movement between the frames for steering and to accommodate traverse of the vehicle over uneven terrain, while preventing the excessive loading of the driving and steering mechanism. Further, the physical size of such connections and their location in the vehicle require that they must be unaffected by mud, dirt and similar materials, be accessible for normal maintenance and permit ready connection and disconnection of the frame parts.

In the present invention the improved steerable vehicle of the articulable type provides for a simplified connection between the frames which defines a steering axis permitting tilting movement to accommodate traverse of rough terrain and yet includes a relatively enclosed lower pivot structure so as to be unaffected by exposure to dirt or other materials picked up from the terrain and the material being handled. This simplified connection structure utilizes a pair of ball and socket type pivots, one of which cooperates with a two axis lower pivot to define the steering axis of the vehicle. This simplified mounting structure permits space for the steering and transmission or drive shaft assemblies extending between the frames of the unit. With such construction, and location of parts, cost and maintenance is reduced and increased strength and stability of the vehicle is provided.

It is therefore the object of this invention to provide an improved steerable vehicle of the articulable type.

Another object of this invention is to provide in an improved steerable vehicle, a simplified connection and suspension of the frames of the vehicle.

It is also an object of this invention to provide in an articulable vehicle, a simplified arrangement of parts which permits a simplified steering and power transmission which may be readily serviced and does not affect the operation of the vehicle in the steering and traverse function on uneven terrain.

A further object of this invention is to provide in a steerable vehicle, a steering axis located on the forward power transmission frame defined by a universal suspension and a two axis suspension which cooperate with a second universal suspension on the rear frame connected to the steering axis by a drag link to provide improved suspension and connection for the vehicle.

A further object of this invention is to provide a steerable vehicle which is stable in operation, low in cost, may be readily connected and disconnected and is easy to maintain.

These and other objects of this invention will become apparent from a reading of the attached description of the drawings wherein:

FIGURE 1 is a side elevation view of the improved steerable vehicle.

FIGURE 2 is a partial perspective view of the vehicle and with the frames turned relative to one another.

FIGURE 3 is a view of a portion of the vehicle taken along the lines 3—3 in FIGURE 1.

FIGURE 4 is a sectional view of the portion of the structure shown in FIGURE 3 taken along the lines 4—4 therein.

FIGURE 5 is a view of a portion of the vehicle shown in FIGURE 1 taken along the lines 5—5 therein.

FIGURE 6 is an elevation view of the drag link of the vehicle, and FIGURE 7 is a view of the rear frame of the vehicle taken along the lines 7—7 in FIGURE 1.

The improved steerable vehicle of the articulable type is shown generally in the elevation view of FIGURE 1. This vehicle is comprised of a forward unit 11 and a rear unit 12 which units are normally connected, as will be hereinafter defined. Each of the units 11 and 12 have a single pair of drive wheels such as is indicated at 15, 16 respectively supported through suitable drive axles 17, 19 anchored on the bases of the frames 18, 20 respectively. The forward unit 11 includes a drive engine 25 connected through a suitable transmission means shown in phantom at 28 and differential 29 to the drive axle 17 of the forward unit. In addition, the forward unit mounts a power driven work tool 32 and controls 34 for the engine, shown generally only since they form no part of the present invention. Mounted on the frame 18 is a protective super structure 38 and suitable seat 40 for the operator. In addition, this cab portion of the forward unit 18 includes a control, indicated generally at 42, and comprising a suitable valve operated through a manually operated handle 44 which controls power to steering control as will be generally hereinafter identified. The forward unit 18 has an auxiliary power source as will be hereinafter identified. The forward drive wheels are connected through the transmission unit 28 to a drive shaft 50, which is suitably secured or journaled on the forward unit through a journal type mounting indicated at 52 and with the drive shaft extending to the rear unit 20. Similarly, the auxiliary transmission is mounted on a journal support (not shown) and connected to an auxiliary drive shaft 55 and a journal type mounting (not shown) to the rear frame unit 20. In the rear unit of the vehicle, the drive wheels 16 or axle 19 is connected through a differential 62 to the drive shaft 50 which is journaled in the support 65. The drive shaft 50 and the journaling supports 52 and 65 on the respective frames 18 and 20 are aligned with the longitudinal axes of the frames. The auxiliary shaft 55 drives an auxiliary power take off, indicated generally at 68 mounted on the rear frame 20. These details form no part of the present invention and are referred to generally herein for information purposes.

The operable connection between the articulable frames 11 and 12 will be seen in FIGURES 1 and 2 as comprising a lower pivot structure indicated generally at 70 and an upper pivot structure indicated generally at 72 defining a substantially vertical steering axis between the units or frames. The upper pivot structure includes generally a support 75 attached to the rear extremity of the forward frame 18 at the upper portion thereof which support mounts a ball type journal member 78 thereon designed to cooperate with a socket 80 to provide an upper ball and socket type pivotal connection at this point. The details of the lower pivot 70 will be best seen in FIGURES 2, 3 and 4 as comprising a generally triangular and U-shaped flange 76 suitably secured to the rear extremity of the forward unit 18 at the lower edge thereof and aligned with the longitudinal axis of this frame. The flange 76 includes apertures 79 and the flange parts are spaced apart and accommodate a cylindrical connecting member 77 having a similar aperture 81 therethrough. A pivot pin 80' is positioned through the aperture 79 in the flange 76 and the aperture 81 in the cylindrical connecting member 77 being secured therein through a suitable means such as a washer and key 82. The vertical axis defined by the pivotal support of the pin 80 within the flange 76 and connecting member 77 align substantially with the center of the ball 78 in the upper pivot structure 72. Connecting member 77 has extending therefrom a shaft 88 with a flange 89 thereon and a threaded extremity 90 at the opposite end thereof. Suitable bearing material 92 is positioned on the shaft 88 to support a sleeve type bearing 95 having connecting plates 100 welded or integrally secured thereon. The threaded extremity 90 of the shaft 88 mounts a securing collar 101 designed to position the sleeve type bearing 95 on the shaft 88. The collar 101 is fixed on shaft 88 through a suitable set screw, indicated at 102. The flanges 100 define a recess 105 within which the collar 101 is positioned and extend on to form the base of the frame member 20 of the rear unit 12 of the vehicle. Included in this pivot structure are suitable grease cups 108 which permits passage of a lubricant through the sleeve bearing 95 and cylindrical member 77 to lubricate the bearing surfaces. It will be noted that the pivot support defined by the sleeve bearing 95 and shaft 88 extend normal to the pivot axis of the pin 80' and, as will be later noted, define a translational or tilting axis for the rear frame unit 12 relative to the forward frame unit 11.

This rear frame unit 20 also includes intermediate its extent a translationally extending flange 110 having a centrally located securing bolt 112 positioned therein and aligned with the longitudinal axis of the rear frame unit 20. Flange 110 is located in the upper portion of the frame unit 20 and mounts a ball type journal or support 122 cooperating with a socket 124. The socket 124 and socket 80 of the upper vertical pivot on the forward frame connect with a drag or compression link 125, as will be best seen in FIGURE 6. This provides a drag type connection or tie between the rear frame 20 and the forward frame 18 on the upper portion of the vehicle which when the longitudinal axes of the frames 18 and 20 are aligned is positioned in a vertical plane with the lower pivot structure 70. The socket units 80 and 124 are substantially identical in form and include retaining caps 130 held in position within the sockets 80 and 124 through suitable means such as keys, indicated at 132. Further, the sockets include grease fittings 135 for lubrication of the pivots at these points. This drag link 125 will pivot on its supports to either side of the longitudinal axes of the respective frames with relative movement of the frames 18, 20. Further, the drive shaft 55 includes a provision for shortening or lengthening the shaft, such as indicated by the splined connection 140, as the vehicle frames 18 and 20 are pivoted about the steering axes thereof to provide the driving connection to the power take off unit 68.

Also connected between the frames 18 and 20 is a steering actuator indicated generally at 160 as comprising a cylinder 162 having a piston therein (not shown) and an output shaft 166 connected thereto. Supporting one end of the cylinder 162 is an integral ball and socket type connecting member 168 which unit universally supports the cylinder to accommodate the relative movement between the frame members. The extremity of the shaft 166 includes a similar universal pivot structure such as is indicated by the ball and socket shown generally at 170. In addition, the cylinder 162 has conduit means indicated at 172 and 174 connected to the cylinder to supply a control fluid to the respective ends of the cylinder and vary the position of the shaft 166 therein and hence the longitudinal movement of the shaft with respect to the cylinder. As shown in FIGURE 1, cylinder 162 is universally mouned on the forward frame and connected to a suitable bracket 180 therein while the uniiversal type ball and socket unit for the shaft 166 is connected to the rear frame unit intermediate its extent at a supporting bracket 184. These fittings are attached to the respective frame members to one side of the longitudinal axis thereof as will be seen in FIGURE 5, such that expansion or contraction of the steering means 170 will cause relative rotative movement of the frames 18 and 20 with respect to the steering axis defined by the pivots 70, 72. Control of the fluid under power to the cylinder 162 is from a suitable fluid source by means of the control actuator shown generally at 42 in accordance with the operation of the handle 44 in the cab of the forward unit of the vehicle. Thus whenever it is desired to turn the vehicle in one direction, the cylinder is energized with the fluid under power to cause the shaft to move out of the confines of the cylinder and rotate the frame members 18 and 20 about the steering axis in one rotative direction. The opposite direction of movement of the steering unit 160 will cause an opposite relative rotative movement between the frames 18, 20 to cause steering of the vehicle in the opposite direction. With the control handle 44 centered, the actuator is designed to be positioned in an off position in which the fluid lines 172, 174 to the cylinder are cut off and the steering cylinder and shaft will remain in the last energized position. Thus fluid is introduced into one end of the cylinder and removed from the opposite end of the cylinder through operation of the valve 43 and reversed to affect steering of the vehicle.

In the operation of the improved articulable vericle, the suspension and connection structure between the forward frame 18 and the rear frame 12 permits relative movement of the respective frames in the traverse of uneven terrain. Thus in the normal working function of the vehicle, whenever the wheels 15, 16 of the forward frame 18 and the rear frame 12 permits relative elevation, the frames will tend to be rotated translationally with respect to one another. The improved pivot and support structure for the frames provides that normal turning movement will be affected through the pin 80' and cylindrical member 77 of the lower steering support as the drag link 125 causes pivoting of the upper pivot member 78 on the cooperating socket 80. Tilting movement between the frames is provided for by allowing the sleeve type pivot structure 95 to rotate on the shaft 88 as the drag link 125 is displaced translationally of the longitudinal axis of the vehicle. Thus the respective pivot structures supporting the drag link will permit displacement of the drag link translationally to accommodate the turning or tilting movement of the frames with respect to one another. The improved support structure is limited in its movement by means of a yoke or limit structure 183 formed in the upper surface of the rear unit in a tapered forward portion 182 thereof. This yoke structure 183 surrounds partially the drag link 125, as will be seen in FIGURE 7, such that displacement of the drag link 125 will engage the sides of the yoke 183 to limit further movement of the drag link. The similar tapered forward extremity for the lower portion of the rear unit, as indicated at 185, mounts the flanges 100 for the sleeve member 95 in the tilting support portion of the lower pivot structure on the rear unit 20. This pivot support structure is substantially enclosed and is not affected by mud, dirt, moisture and the like, to substantially reduce wear and maintenance in the connecting structure for the vehicle. Further, the addition of the removable collar 100 and the key 82 in the pin 80′ permits ready access to remove or separate the vehicles at this point. This structure provides for increased load bearing ability and substantially increases the stability and wear characteristics of the suspension of the vehicle.

Upon the engagement of uneven terrain by the vehicle at either the front or back wheels thereof, the steering structure which is provided by a single cylinder 160 will upon relative tilting of the parts affect turning movement of the vehicle in such a direction so as to increase stability of the same. The improved connecting structure permits traverse of uneven terrain and translational movement of one unit with respect to the other to provide for improved working and work handling characeristics of the vehicle. Therefore in considering this invention it should be remembered that the present disclosure is intended to be illustrative only and the scope of the invention should be determined by the appended claims.

I claim:

1. A steerable vehicle comprising, a forward frame and a rear frame, each of said frames having a wheel driving axle of the non-steerable type secured thereon, a vertical steering axis defined by upper and lower pivots integral with the rear end of the forward frame and aligned with the longitudinal axis thereof, the rear frame having tapered forward upper and lower extremities, a sleeve type pivot means secured to the lower vertical pivot being positioned normal thereto and connected to the lower tapered forward extremity of the rear frame, additional pivot means included within the rear frame remote from the upper tapered extremity and aligned with the longitudinal axis of the rear frame, drag link means connecting the additional pivot means and the upper vertical pivot of the steering axis, a single steering cylinder including a shaft, a universal type connection means mounting one extremity of the cylinder to one of said frames and the extremity of said shaft to the other of said frames and with said universal connection means being mounted on said frames to one side of the longitudinal axis of said frames such that relative movement of the cylinder and shaft will cause relative movement of the frames about the steering axis, displacement of either of the frames about their respective longitudinal axis being operative to cause said drag link to pivot on its vertical pivot and additional pivot means as said frames rotate relative through the normal sleeve type pivot means, and yoke means included in the upper tapered extremity of the rear frame and partially surrounding the drag link to limit movement of the drag link on its pivot means.

2. The steerable vehicle of claim 1 in which the upper pivot means of the steering axis and the additional pivot means are ball and socket type pivots.

3. The steerable vehicle of claim 2 in which the lower vertical pivot is a pin extending through a U shaped bracket and cylindrical connecting member with an aperture therein, and the sleeve type pivot means includes a shaft integral with the cylindrical connecting member and extending normal to the axis of the cylindrical connecting member with a cylindrical sleeve journaled thereon, and a removable cylindrical anchor mounted on the shaft and retaining the cylindrical sleeve thereon.

4. The steerable vehicle of claim 3 in which the universal type connection means attached to the steering cylinder and shaft are ball and socket type pivots with the longitudinal movement of the cylinder and shaft causing rotative relative movement between the frames.

5. The steerable vehicle of claim 4 and including engine means mounted on the forward frame, transmission means drivingly connecting the engine to the drive axle of the first frame, drive shaft means, universal type connection means connecting said drive shaft means to the transmission and mounting the drive shaft means at one extremity on the forward frame, second universal type connection means mounting the other extremity of said drive shaft means on the rear frame, and transmission means connecting the drive shaft means to the drive axle on the rear frame.

6. The steerable vehicle of claim 5 and including control means and a source of fluid power controlled thereby mounted on one of said frames and connected to the cylinder to cause selective axial movement between the cylinder and shaft to control relative rotative movement of the frames on the steering axis of the vehicle.

7. A steerable vehicle comprising, a forward frame and a rear frame, each of said frames having a wheel driving axle of the non-steerable type secured thereon, a steering axis defined by vertically aligned upper and lower pivot structures attached to the rear end of the forward frame and centrally located thereon, the rear frame having a rotative type pivot means at its lower forward extremity connected to the lower pivot structure of the steering axis on the forward frame, additional pivot means included within the rear frame remote from the upper forward extremity and located centrally therein, link connection means connecting the additional pivot means and the upper pivot structure of the steering axis, steering means including universal type connecting means connected respectively at its extremities to the forward and rear frames and located to one side of the longitudinal axes of the respective frames such that movement of the steering means will cause relative movement of the frames about the steering axis, and limit stop means included in the upper forward extremity of the rear frame cooperating with the link connection means to limit movement thereof and hence translational movement of the frames relative to one another.

8. A steerable vehicle comprising, a forward frame and a rear frame, each of said frames having a wheel driving axle of the non-steerable type secured thereof, a steering axis defined by vertically aligned upper and lower pivot structures attached to the rear end of the forward frame and centrally located thereon, the rear frame having a rotative type pivot means at its lower forward extremity connected to the lower pivot structure of the steering axis on the forward frame, additional pivot means included within the rear frame remote from the upper forward extremity and located centrally therein, link connection means connecting the additional pivot means and the upper pivot structure of the steering axis, steering means including universal type connecting means connected respectively at its extremities to the forward and rear frames and located to one side of the longitudinal axes of the respective frames such that movement of the steering means will cause relative movement of the frames about the steering axis, and limit stop means in the form of a U-shape yoke included in the end of the upper forward extremity of the rear and partially surrounding the link connection means to limit movement thereof and hence translational movement of the frames relative to one another.

9. A steerable vehicle comprising, a forward frame and a rear frame, each of said frames having a wheel driving axle of the non-steerable type secured thereon, a steering axis defined by vertically aligned upper and lower pivot structures attached to the rear end of the forward frame and centrally located thereon, said lower vertical pivot of said steering axis including additional means permitting translational rotational movement normal to the steering axis and connected to the lower forward extremity of the rear frame, additional pivot means included within the rear frame remote from the upper forward extremity and located centrally therein, link connection means connecting the additional pivot means and the upper pivot structure of the steering axis, steering means including universal type connecting means connected respectively at its extremities to the forward and rear frames and located to one side of the longitudinal axes of the respective frames such that movement of the steering means will cause relative movement of the frames about the steering axis, and limit stop means included in the upper forward extremity of the rear frame cooperating with the link connection means to limit movement thereof and hence translational movement of the frames relative to one another.

10. The steerable vehicle of claim 9 in which the upper vertical steering pivot and the additional pivot means are ball and socket type pivot structures and the lower steering pivot includes a separate and enclosed two axis pivot structure.

References Cited by the Examiner
UNITED STATES PATENTS

| | | | |
|---|---|---|---|
| 1,622,470 | 3/1927 | Shipley et al. | 280—461 |
| 2,223,375 | 12/1940 | Le Tourneau | 280—497 |
| 2,404,362 | 7/1946 | Carlson | 280—492 |
| 2,459,098 | 1/1949 | Simmons | 280—461 X |
| 2,594,695 | 4/1952 | Storey | 180—50 X |
| 2,827,715 | 3/1958 | Wagner. | |
| 2,941,612 | 6/1960 | Bernotas | 180—51 |
| 3,007,590 | 11/1961 | Mathew et al. | 180—51 X |
| 3,157,239 | 11/1964 | Barnotas | 180—51 |
| 3,167,147 | 1/1965 | Symons | 180—51 |

KENNETH H. BETTS, *Primary Examiner.*